US008873450B2

United States Patent
Ai et al.

(10) Patent No.: US 8,873,450 B2
(45) Date of Patent: Oct. 28, 2014

(54) SYNCHRONIZATION PROCESSING METHOD FOR MULTIMEDIA BROADCAST MULTICAST SERVICE, UPPER LAYER NETWORK ELEMENT, AND LOWER LAYER NETWORK ELEMENT THEREOF

(75) Inventors: Jianxun Ai, Shenzhen (CN); Hengxing Zhai, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 118 days.

(21) Appl. No.: 13/259,817

(22) PCT Filed: Mar. 18, 2010

(86) PCT No.: PCT/CN2010/071127
§ 371 (c)(1),
(2), (4) Date: Apr. 24, 2012

(87) PCT Pub. No.: WO2010/145231
PCT Pub. Date: Dec. 23, 2010

(65) Prior Publication Data
US 2012/0201184 A1 Aug. 9, 2012

(30) Foreign Application Priority Data
Oct. 27, 2009 (CN) .......................... 2009 1 0206665

(51) Int. Cl.
*H04H 20/71* (2008.01)
*H04W 56/00* (2009.01)
*H04L 12/18* (2006.01)
*H04W 4/06* (2009.01)

(52) U.S. Cl.
CPC ......... *H04L 12/189* (2013.01); *H04W 56/0085* (2013.01); *H04W 56/00* (2013.01); *H04W 4/06* (2013.01)
USPC ............ 370/312; 370/252; 370/350; 370/503

(58) Field of Classification Search
None
See application file for complete search history.

(56) References Cited

U.S. PATENT DOCUMENTS

| 2008/0101334 | A1* | 5/2008 | Bakker et al. ................. 370/350 |
| 2010/0195558 | A1* | 8/2010 | Koskinen ...................... 370/312 |
| 2012/0182923 | A1* | 7/2012 | Huang et al. .................. 370/312 |

FOREIGN PATENT DOCUMENTS

| CN | 101043653 A | 9/2007 |
| CN | 101258697 A | 9/2008 |
| CN | 101370165 A | 2/2009 |
| WO | WO-2009/016619 A2 | 2/2009 |

OTHER PUBLICATIONS

Extended European Search Report issued in European Application No. 10788627.7 dated Dec. 14, 2012.
Alcatel et al., "Text Proposal 'Architecture for Content Synchronisation'" 3GPP Draft; R3-061583, Mobile Competence Centre, vol. RAN WG3, Seoul Korea, Oct. 17, 2006, pp. 1-7.

(Continued)

*Primary Examiner* — David Oveissi
(74) *Attorney, Agent, or Firm* — Venable LLP; Robert Kinberg; George L. Howarah (57) ABSTRACT

A synchronization processing method for multimedia broadcast multicast service (MBMS), an upper layer network element, and a lower layer network element thereof. The method includes: an upper layer network element sends a synchronization protocol control frame to a lower layer network element, wherein, the synchronization protocol control frame carries the data packet length information of the pre-determined data frame in the synchronization sequence corresponding to the synchronization protocol control frame, and the pre-determined data frame includes at least one of: each data frame, part of a data frame.

9 Claims, 5 Drawing Sheets (56) References Cited

OTHER PUBLICATIONS

"Universal Mobile Telecommunications System (UMTS); Synchronization in UTRAN Stage 2 (3GPP TS 25.402 version 7.5.0 Release 7)" ETSI TS 125 402, vol. V7.5.0 Jan. 1, 2008, pp. 1-54.
Nokia "R3-061552 MBMS L Transmission Synchronization with Segmentation and Concatenation," Internet Citation, Oct. 5, 2006, Retrieved from: http://www.3gpp.org/ftp/tsg_ran/WG3_Iu/TSGR3_53bis/docs.
Alcatel "Inter E-Node B-Node Synchronization in LTE MBMS," 3GPP Draft; R1-061969 Mobile Competence Centre, vol. RAN WG1, Aug. 23, 2006.
International Search Report issued in PCT/CN2010/071127 dated Aug. 5, 2010.
MBMS synchronisation protocol (SYNC) Release 8, 3GPPTS 25,446 V8.0.0, p. 7 line 17, p. 8, lines 18-24, p. 10, lines 18-25, p. 12, lines 5-8, p. 16, lines 15-17, Dec. 31, 2008.

* cited by examiner

SYNCHRONIZATION PROCESSING METHOD FOR MULTIMEDIA BROADCAST MULTICAST SERVICE, UPPER LAYER NETWORK ELEMENT, AND LOWER LAYER NETWORK ELEMENT THEREOF

FIELD OF THE INVENTION

The present invention relates to the communication field, specifically, to a synchronization processing method for Multimedia Broadcast Multicast Service (hereinafter referred to as MBMS), an upper layer network element, and a lower layer network thereof.

BACKGROUND OF THE INVENTION

In order to make efficient use of mobile network resources, the 3rd Generation Partnership Project (hereinafter referred to as 3GPP) has put forward the MBMS, a technology of sending data to multiple targets from one data source, thus sharing the network (including a core network and an access network) resources and improving the utilization ratio of network resources (especially air interface resources).

Figure 1:
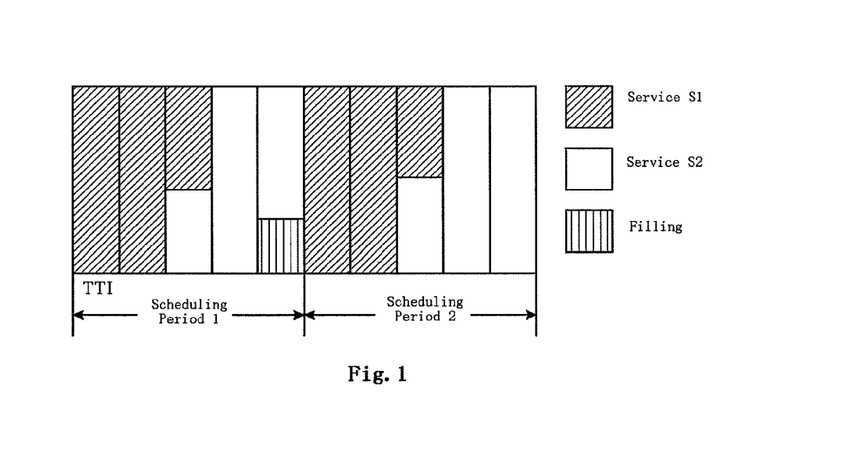
FIG. 1 is a schematic diagram of multiple MBMS services sharing channel resources in a dynamic multiplexing mode according to the related art.
Figure 2:
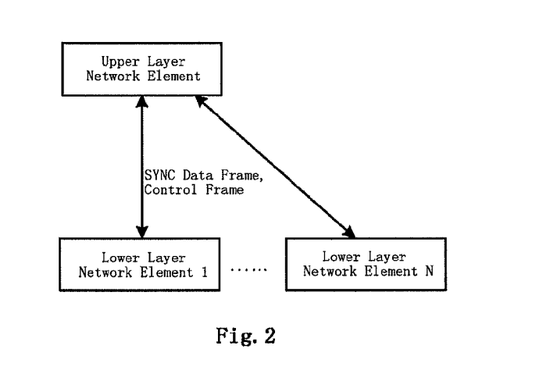
FIG. 2 is a schematic diagram of the network system for achieving synchronous transmission of MBMS service of multiple network elements according to the related art.
Figure 3:
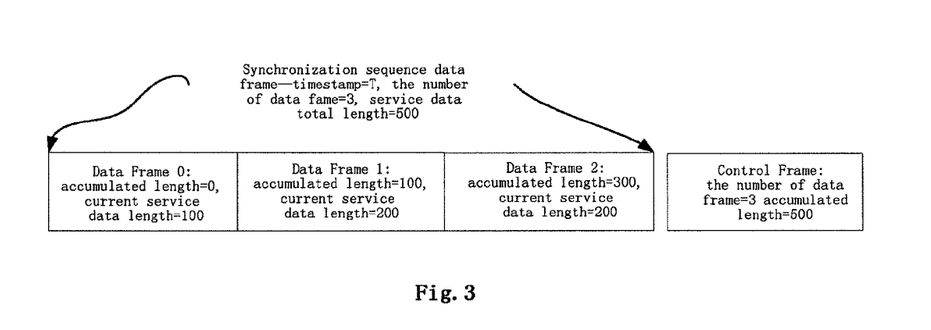
FIG. 3 is a schematic diagram of a synchronization sequence sending MBMS service and its control frame according to the related art.

As shown in FIG. 1, multiple services can multiplex channel resources dynamically in one scheduling period. In the case shown in FIG. 1, Service S1 and Service S2 multiplex data in one scheduling period. In order to achieve synchronous transmission of the MBMS service in a cell consisting of multiple network element entities (base station network elements), the existing technology provides a processing method of synchronization protocol (SYNC), and the corresponding network system includes an upper layer network element and lower layer network elements (1~N). As shown in FIG. 2, the synchronous transmission process of this SYNC protocol comprises the following processing steps:

Step S1. An upper layer network element sends a MBMS service data packet to each lower layer network element (1~N), and this service data packet bears payload and carries timestamp information, data packet sequence number information, and accumulated service data length information etc. A service data packet is also called a SYNC data frame in the SYNC protocol. At the end of each synchronization sequence, the upper layer network element also sends a SYNC control frame, which carries the information indicating the total number of the data frames in the synchronization sequence corresponding to this control frame and the total length information of service data. FIG. 3 shows an example of an upper layer network element sending a synchronization sequence data frame and control frame to a lower layer network element.

Step S2. The lower layer network element receives the foregoing synchronization sequence sent from the upper layer network element, and determines by means of detecting the sequence number of the service data packets whether any service data packet is lost as well as the total length of the service data packets that are already lost.

Step S3. For the service data carried in the service data packet in the same synchronization sequence, each lower layer network element begins to send the service data packets successively at the wireless interface during the scheduling period corresponding to the timestamp of the service data packet.

Each lower network element performs the Radio Link Control (hereinafter referred to as RLC) protocol processing on the MBMS service data packet independently, which comprises distribution of RLC sequence number and RLC segmentation and concatenation. Each lower layer network element maintains the current RLC sequence number, and the initial RLC sequence number can be kept synchronous through allocation. In this way, each lower network element can keep the distribution of PLC sequence number consistent while processing data.

In the existing technology, in the case that data packets are lost (especially when it is not successive that data packets are lost), a lower layer network element can obtain the length of the lost data packet by detecting the accumulated data packet length. In such a case, the lower layer network element can set a virtual data packet whose length is the same as that of the lost data packet when performing the RLC layer protocol processing. RLC segmentation and concatenation are performed on this virtual data packet as other data packets correctly received. When being sent at a real wireless interface, sending will not be performed during a Transmission Time Interval (hereinafter referred to as TTI) in which the data of this virtual data packet is contained. Such a processing method is called mute processing. By mute processing, the mutual interference caused by the inconformity between the virtual data packet and the real service data successfully received by other network elements can be avoided. In addition, since the length of this virtual data packet is the same as that of the corresponding lost data packet, and the size of the space the virtual data packet occupies in RLC Protocol Data Unit (hereinafter referred as to PDU) is the same as that of a real data packet, the initial position of the successfully received data packet in the RLC PDU is consistent with that of the network element which has not lost any data packet. With such processing, the processing of the network element with lost data packet(s) and the network element without any lost data packets can be kept consistent.

Considering the possibility that a lower layer network element may restart, the RLC sequence number that the lower layer network element previously maintained for this MBMS service will be lost after the restarting, and then the lower layer network element will not be able to determine the RLC sequence number after performing the RLC segmentation and concatenation on the next received MBMS service data packet. In order to solve this problem, the method of resetting RLC sequence number is adopted in the existing technology. Specifically, at the beginning of a scheduling period or a predetermined time interval, the RLC sequence number starts to be distributed from an initial value (0), so that the restarted lower layer network element can keep synchronization of the RLC sequence number with other network elements again at the beginning of a scheduling period.

Considering the possibility that data packet(s) may be lost or even data packets may be lost successively when data is transmitted from an upper layer network element to a lower layer network element, according to the existing SYNC protocol technology, the lower layer network element can avoid through the mute processing the damage caused by losing data packet(s), but the forgoing method has a serious problem: in view of the particularity of the RLC processing, when the RLC processing is performed on a service data packet or called a RLC Service Data Unit (hereinafter referred to as SDU), the size of the space the service data packet occupies in RLC PDU depends on its specific location. During the RLC processing on one RLC SDU, the number of the RLC protocol Length Indications (hereinafter referred as to LI) it occupies is uncertain, capable of being 0, 1 or 2 depending on its specific situation in the RLC PDU. Therefore, during the specific processing: if the number of the lost service data packet is 1, the lower layer network element can calculate the certain space occupied in RLC PDU according to its length; if data are lost successively, the lower layer network element can just obtain the total length of those lost data packets instead of the length of each data packet among the multiple lost data packets, because the size of the real loading space of the RLC PDU that those lost data packets occupy can not be calculated correctly.

Figure 4:
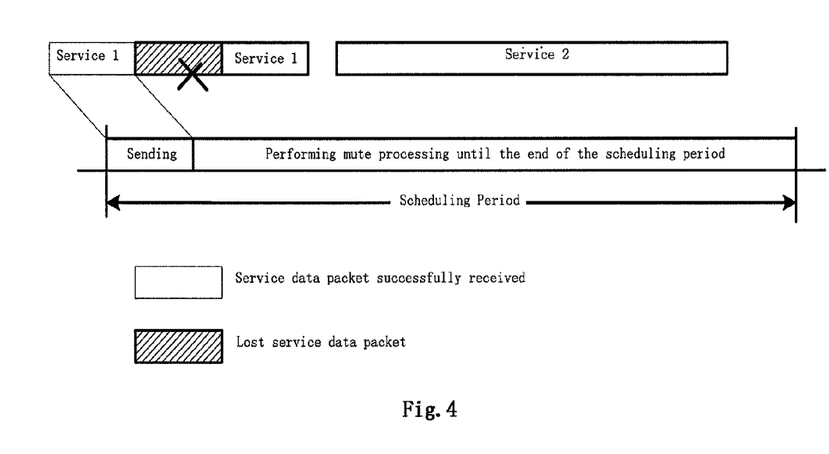
FIG. 4 is a schematic diagram of asynchronization caused by the MBMS service data being lost according to the related art.

In the foregoing situation that multiple data packets are lost successively, since the lower layer network element can not obtain the length of each lost data packet, thus resulting in that the RLC processing on the service data can not be inconsistent with that of other lower layer network elements without any lost data packets, the lower layer network element can not send the service data with lost data packets. In addition, if multiple services multiplex the same channel, this lower layer network element can not send the data of other services after their data packets are lost successively, otherwise interference between cells will arose. For example, as shown in FIG. 4, the data of Service 1 is lost, which poses a problem in which Service 1 can only receive the correctly sent data after the data is lost, and the data packet(s) following the lost one and even the data packets of Service 2 can not be received.

With regard to the problem in related technologies that a lower layer network element can not keep synchronization with other lower layer network elements which receive data packets successfully in the situation that multiple data packets are lost successively, no effective solutions have been proposed till now.

SUMMARY OF THE INVENTION

The present invention is proposed for the problem that, when data packets are lost successively, a lower layer network element fails to keep the synchronization with other lower layer network elements which receive data packets successfully because it cannot obtain the length of each lost data packet. Therefore, the main purpose of the present invention is to provide a synchronization processing method for MBMS, an upper layer network element, and a lower layer network thereof to resolve at least one of the above mentioned problems.

In order to achieve the above mentioned purpose, according to one aspect of the present invention, a synchronization processing method for MBMS is provided.

The synchronization processing method for MBMS according to the present invention comprises: an upper layer network element sends a synchronization protocol control frame to a lower layer network element. Wherein, the synchronization protocol control frame carries data packet length information of a pre-determined data frame in the synchronization sequence corresponding to the synchronization protocol control frame, and the pre-determined data frame includes either of the following: each data frame, or partial data frames.

Further, the data packet length information of the pre-determined data frame includes either of the following: the length information of the pre-determined data frame, and the length information of service date carried in the pre-determined data frame.

Further, the synchronization protocol control frame includes the number of the data packet length of the pre-determined data frame carried therein.

Further, partial data frames are the data frames from M to M+L in every N data frames among all the data frames, wherein, M<=N , M+L<=N; or, partial data frames are the data frames except for Data Frame M in every N data frames among all the data frames, wherein, M<=N.

Further, the frame format of the synchronization protocol control frame includes at least one of the following: Type 0 frame format defined in the SYNC protocol, and a pre-defined frame format.

Preferably, an upper layer network element includes broadcast multicast service center, and a lower layer network element includes at least one of the following: BS eNB, and radio network controller.

In order to achieve the above mentioned purpose, according to one aspect of the present invention, a synchronization processing method for MBMS is provided.

The synchronization processing method for MBMS according to the present invention comprises: a lower layer network element receives a synchronization protocol control frame sent from an upper layer network element, wherein, the synchronization protocol control frame carries data packet length information of pre-determined data frames in the synchronization sequence corresponding to the synchronization protocol control frame, and the pre-determined data frames comprise either of the following: each data frame, or partial data frames.

Further, after the lower layer network element receives the synchronization protocol control frame sent from the upper layer network element, the foregoing method also comprises: in the condition that the lower layer network element detects that a data frame has been lost in the synchronization sequence, the lower layer network element performs the synchronization recovery processing according to the data packet length information of the pre-determined data frame in the synchronization protocol control frame.

In order to achieve the above mentioned purpose, according to another aspect of the present invention, an upper layer network element is provided.

The upper layer network element according to the present invention comprises: Sending Module, used for sending a synchronization protocol control frame to a lower layer network element, wherein, the synchronization protocol control frame carries the data packet length information of the pre-determined data frame in the synchronization sequence corresponding to the synchronization protocol control frame, and the pre-determined data frame comprises either of the following: each data frame, or partial data frames.

In order to achieve the above-mentioned purpose, according to a further aspect of the present invention, a lower layer network element is provided.

The lower layer network element according to the present invention comprises: Receiver Module, used for receiving a synchronization protocol control frame sent from an upper layer network element, wherein, the synchronization protocol control frame carries data packet length information of a pre-determined data frame in the synchronization sequence corresponding to the synchronization protocol control frame, and the pre-determined data frame comprises either of the following: each data frame, or partial data frames.

Further, the foregoing lower layer network element also comprises: Synchronization Recovery Processing Module, used for performing the synchronization recovery processing according to the data packet length information of the pre-determined data frame in the synchronization protocol control frame in the condition that the lower layer network element detects that a data frame in the synchronization sequence has been lost.

According to the present invention, through carrying in a synchronization control frame the length of each data frame or partial data frames in the synchronization sequence corresponding to the synchronization control frame or the length of the service data in the data frame, the present invention resolves the problem that the lower layer network element can not keep the synchronization with other lower layer network elements which receive the data packets successfully due to incapability of obtaining each lost data packet length in the condition that multiple data packets are lost successively, and can avoid that the low layer network element loses synchronization for a long time in the condition that service data packets are lost, thus improving the Robustness and efficiency for the MBMS service synchronization.

BRIEF DESCRIPTION OF THE DRAWINGS

The drawings illustrated herein are used to provide a further understanding of the present invention, and constitute one part of this application. The exemplary embodiments of the present invention and their description are used to explain the present invention and shall not improperly limit the present invention. In the drawings.

DETAILED DESCRIPTION OF THE EMBODIMENTS

Summary of Functions

Considering the problems in the prior art, the embodiments of the present invention provide a synchronization processing solution for MBMS. The processing principle of this solution is: an upper layer network element sends a synchronization protocol control frame to a lower layer network element, wherein this synchronization protocol control frame carries data packet length information of pre-determined data frames in the synchronization sequence corresponding to the synchronization protocol control frame, and the pre-determined data frames comprise either of the following: each data frame or partial data frames. This solution can avoid that the lower layer network element loses synchronization for a long time in the condition that service data packets are lost, thus improving the Robustness and efficiency for the MBMS service synchronization.

Hereinafter, the present invention will be described with reference to the drawings and in conjunction with the embodiments. It should be noted that, when no conflicts occur, the embodiments of the present application and the features in the embodiments can be combined with each other.

Method Embodiments

According to the embodiment of the present invention, a synchronization processing method for MBMS is provided. This method comprises: an upper layer network element sends a synchronization protocol control frame to a lower layer network element, wherein the synchronization protocol control frame carries data packet length information of pre-determined data frames in the synchronization sequence corresponding to the synchronization protocol control frame, and the pre-determined data frame comprises either of the following: each data frame, or partial data frames.

Preferably, the lower layer network element performs the synchronization recovery processing according to the data packet length information of the pre-determined data frames in the synchronization protocol control frame in the condition that the lower layer network detects that data frame(s) in the synchronization sequence are lost.

Preferably, the data packet length information of the pre-determined data frames comprises one of the following: the length information of the pre-determined data frames and the length information of service data carried in the pre-determined data frames. The synchronization protocol control frame can comprise the number of the data packet lengths of the carried pre-determined data frames. The partial data frames are the data frames from M to M+L in every N data frames among all the data frames, wherein M<=N, M+L<=N; or, the partial data frames are the data frames except for Data Frame M in every N data frames among all the data frames, wherein M<=N.

Preferably, the frame format of the synchronization protocol control frame includes at least one of the following: Type 0 frame format defined in the SYNC protocol, and a pre-defined frame format.

Preferably, an upper layer network element can comprise broadcast multicast service center, and a lower layer network element can comprise at least one of the following: BS eNB, and radio network controller.

According to the embodiment of the present invention, a synchronization processing method for MBMS is provided. The method comprises: a lower layer network element receives a synchronization protocol control frame sent from an upper layer network element, wherein the synchronization protocol control frame carries data packet length information of pre-determined data frames in the synchronization sequence corresponding to the synchronization protocol control frame, and the pre-determined data frame comprises either of the following: each data frame, or partial data frames.

Figure 5:
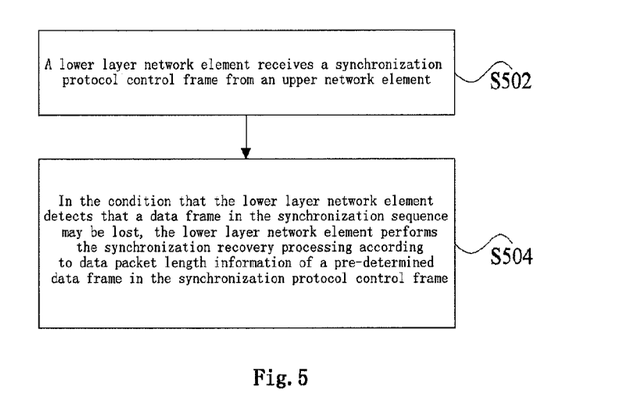
FIG. 5 is a flowchart of the synchronization processing method for MBMS according to the embodiment of the present invention.

FIG. 5 is a flowchart of the synchronization processing method for MBMS according to the embodiment of the present invention. As shown in FIG. 5, preferably, this method comprises Step S502 to Step S504 as follows:

Step S502. A lower layer network element receives a synchronization protocol control frame sent from an upper layer network element, wherein the synchronization protocol control frame carries data packet length information of pre-determined data frames in the synchronization sequence corresponding to the synchronization protocol control frame, and the pre-determined data frame comprises either of the following: each data frame, or partial data frames.

Step S504. The lower layer network element performs the synchronization recovery processing according to the data packet length information of the pre-determined data frames in the synchronization protocol control frame in the condition that the lower layer network element detects that packet data (s) in the synchronization sequence are lost.

The realization process of the embodiments of the present invention will be described in conjunction with examples.

Embodiment One

Figure 6:
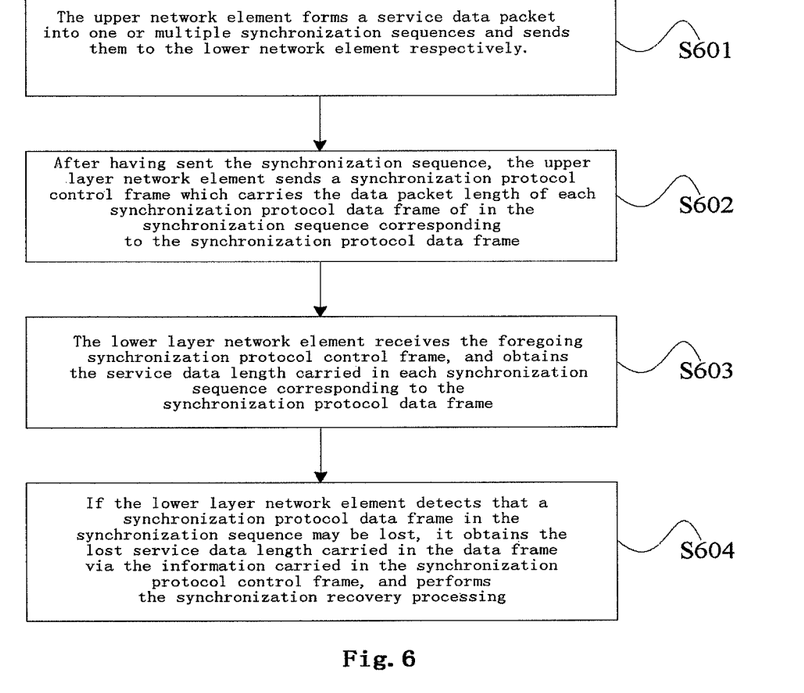
FIG. 6 is a flowchart of the synchronization processing method for MBMS according to Embodiment One of the present invention.

As shown in FIG. 6, FIG. 6 is a flowchart of the synchronization processing method for multimedia broadcast multicast service according to the embodiment of the present invention. This embodiment describes a processing flow in the condition that pre-determined data frames comprise each data frame, including the following operations from Step S601 to Step S604:

Step S601. An upper layer network element makes service data packets forming one or multiple synchronization sequences, and sends them to a lower layer network element sequentially. The upper layer network element makes one or multiple synchronization protocol data frames forming one synchronization sequence, and the synchronization protocol data frames in a same synchronization sequence carry a same timestamp information, wherein the upper layer network element refers to a data-sending network element of the synchronization protocol, and the lower layer network element refers to a data-receiving network element of the synchronization protocol.

Step S602. After sending the synchronization sequence, the upper layer network element sends a synchronization protocol control frame, which carries the data packet length of each synchronization protocol data frame in the corresponding synchronization sequence. The above-mentioned data packet length can be the length of the service data packet carried in the synchronization protocol data frame, or the length of the synchronization protocol data frame. The synchronization protocol control frame can also carry timestamp information of the corresponding synchronization sequence.

Step S603. The lower layer network element receives the above-mentioned synchronization protocol control frame, and obtains the length of the service data carried in each synchronization protocol data frame of the synchronization sequence corresponding to the synchronization protocol control frame.

Step S604. If the lower layer network element detects that a synchronization protocol data frame in the synchronization sequence has been lost, it obtains the length of the service data carried in lost the data frame via the information carried in the synchronization protocol control frame, and performs the synchronization recovery processing.

EXAMPLE 1

Herein, the specific examples of the processing flow provided in Embodiment 1 are described in detail. In this example, an upper layer network element can be the Broadcast Multicast Service Center (hereinafter referred to as BMSC), and a lower layer network element can be eNB, radio network controller or other wireless access network elements. The SYNC protocol data frame can be Type 1 frame format as defined in the SYNC protocol, and the SYNC protocol control frame can be Type 0 frame format as defined in the SYNC protocol or a new frame format defined in SYNC protocol, i.e. a pre-determined frame format. BMSC makes data packets forming one or multiple synchronization sequences, and each synchronization sequence comprises one or multiple Type 1 data frames. Each Type 1 data frame carries synchronization sequence timestamp information.

In the control frame structure can be defined the number information of data packets, indicating the number of the data frames in a synchronization sequence. In this example, the number information of the above-mentioned data packets can be understood as the number information of the carried data packet lengths. Meanwhile, in the control frame is also defined the information of a group of data packet lengths, and each data packet length indicates the service data length of one data frame in the synchronization sequence or the payload length carried in the data frame.

Figure 7:
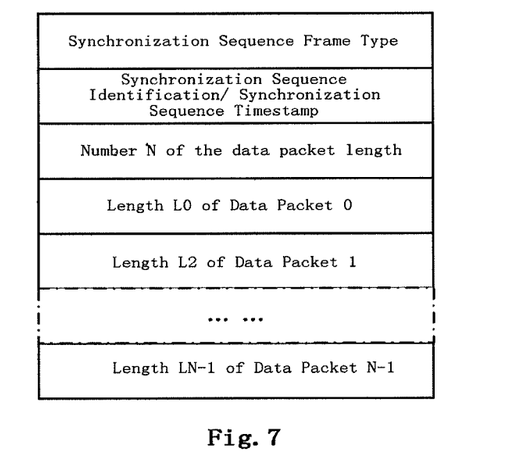
FIG. 7 is a schematic diagram of the synchronization protocol control frame format according to the embodiment of the present invention.

FIG. 7 is a schematic diagram of a synchronization protocol control frame format according to the embodiment of the present invention. This diagram illustrates how to carry the length of the service data in a control frame, that is, the number N of the data packet lengths carried in the control frame and the length of each data packet. In practice, this data frame can comprise other contents or adopt other formats, and the embodiment of the present invention does not limit them.

Figure 8:
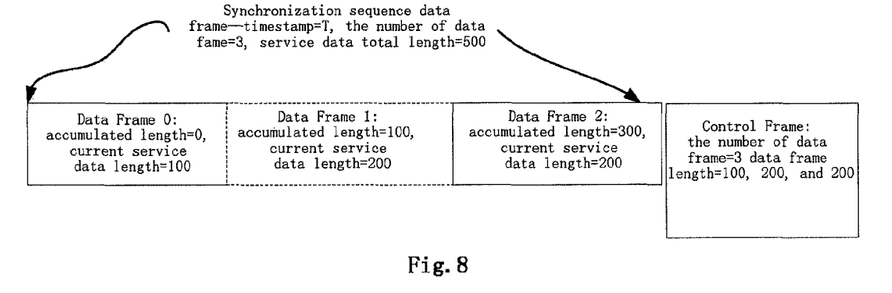
FIG. 8 is a schematic diagram of the synchronization sequence and its control frame according to Example 1 of the present invention.

FIG. 8 is a schematic diagram of a synchronization sequence and its control frame according to Example 1 of the present invention. As shown in FIG. 8, BMSC sends a synchronization protocol control frame at the end of each synchronization sequence, that is, after it sends a synchronization sequence. Specifically, the number of data frames in one synchronization sequence is 3, the lengths of the three data frames are L0, L1, L2 respectively and the data packet sequence numbers thereof are 0, 1, 2 respectively. Accordingly, in the control frame corresponding to this synchronization sequence, BMSC carries the length of this synchronization sequence data frame, namely, L0, L1, L2, and also carries the number of the data frames (it can also be understood as the number of the carried data packet lengths) in this synchronization sequence, i.e. 3. Alternatively, BMSC can send the copy of the above-mentioned control frame for once or multiple times.

If any data packet is lost during sending the foregoing synchronization sequence to eNB, for example, if the synchronization sequence data frames with the sequence number 1 and 2 are lost, eNB can detect that synchronization sequence data frames have been lost through the mechanism of SYNC protocol. Through reading the information carried in the received synchronization protocol control frame, eNB can obtain the lengths of the lost data frames 1 and 2 being L1 and L2 respectively. Thus, eNB can construct two virtual data packets whose lengths are equal to L1 and L2 respectively, and perform the radio link control layer protocol processing on the two virtual data packets in the order of the sequence numbers of the data frames, alike the data carried in Data Frame 0 that is correctly received. Thus, the position and length occupied by the virtual data packets in the RLC PDU in the radio link control protocol layer processing are the same as if the two lost data packets were successfully received, however the virtual data packets have no real service data. When sending the above-mentioned service at wireless interfaces, eNB can choose not to send the RLC PDU including the above-mentioned virtual data packets, thus avoiding the interference resulting from signal inconformity with neighboring cell.

Embodiment Two

Figure 9:
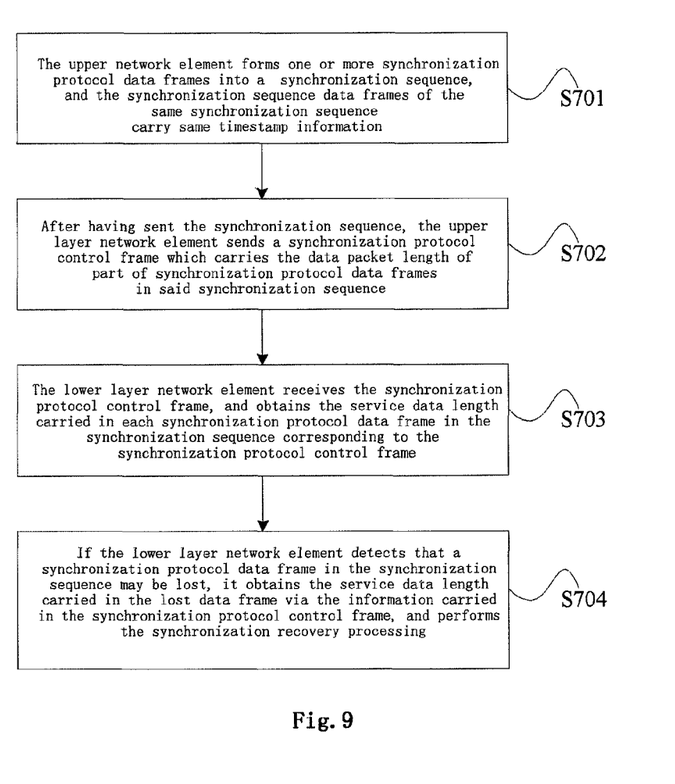
FIG. 9 is a flowchart of the synchronization processing method for MBMS according to Embodiment 2 of the present invention.

As shown in FIG. 9, FIG. 9 is a flowchart of the synchronization processing method for multimedia broadcast multicast service according to the embodiment of the present invention. This embodiment describes a processing flow in a condition that the pre-determined data frames comprise the partial data frames, comprising the following operations from Step S701 to Step S704:

Step S701. An upper layer network element makes one or multiple synchronization protocol data frames (or hereinafter referred to as data frame for short) forming a synchronization sequence, and the synchronization protocol data frames in the same synchronization sequence carries the same timestamp information. The upper layer network element makes the service data packets forming one or multiple synchronization sequences and sends them to the lower layer network element sequentially, wherein the upper layer network element refers to the data-sending network element of the synchronization protocol, and the lower layer network element refers to the data-receiving network element of the synchronization protocol.

Step S702. After sending the synchronization sequence, the upper layer network element sends a synchronization protocol control frame, which carries the data packet length of part of synchronization protocol data frames in the above-mentioned synchronization sequence. The data packet length can be the length of the service data packet carried in the synchronization protocol data frame, or the length of the synchronization protocol data frame. Furthermore, the synchronization protocol control frame can also carry the timestamp information of the corresponding synchronization sequence, wherein part of the synchronization protocol data frame refers to the data frames selected according to a specific pattern. The available patterns comprise:

1. the data frames from M to M+L in every N data frames, wherein M and M+L<=N;
2. All data frames except for Data Frame M in every N data frames, wherein M<=N.

Step S703. The lower layer network element receives the synchronization protocol control frame and obtains the service data length carried in each synchronization protocol data frame of the corresponding synchronization sequence.

Step S704. If the lower layer network element detects that a synchronization protocol data frame in the synchronization sequence is lost, it obtains the service data length carried in the lost data frame via the information carried in the synchronization protocol control frame, and performs the synchronization recovery processing. It should be noted that, if the control frame doesn't carry the length of the lost data packet, but carries the data packet length of the data frame after and/or before the service data packet lost, the lower layer network element can make a calculation according to the length of these data packets carried in the control frame and the accumulated data length carried in the received data frame, etc., so as to obtain the data packet length of the lost data frame.

Compared with the solution of carrying the data packet length of all data frames, the solution provided in the embodiment can save the length of a control frame, and is applicable to the situation where small probability occurs that multiple data packets are lost successively from the upper layer network element to the lower layer network element.

As for the above-mentioned second pattern of selecting part of the synchronization protocol control frames, if the control frame carries the data packet length of N−1 data frames in every N data frames, the synchronization recovery can be achieved in the method provided in this embodiment in a condition that the number of the successively lost data frames is less than N+1.

EXAMPLE 2

The present example describes a specific example of the processing flow provided in Embodiment 2 in detail. In this example, an upper layer network element can be BMSC or others, and a lower layer network element can be eNB, radio network controller or other wireless access network elements. The SYNC protocol data frame can be Type 1 frame format as defined in the SYNC protocol, and the SYNC protocol control frame can be Type 0 frame format as defined in the SYNC protocol, or a new frame format defined in the SYNC protocol, namely, a pre-determined frame format.

BMSC makes service data packets forming one or multiple synchronization sequences, and each synchronization sequence includes one or multiple Type 1 data frames. Each Type 1 data frame carries the timestamp information of a synchronization sequence, and also the accumulated data length information which is the length of the accumulated data packet in a synchronization sequence. In other words, Data Frame N carries the sum of data packet length of the data frames 0 to N or N−1.

In the control frame structure can be defined the number information of data packets, which indicates the number of data frames in a synchronization sequence as well as the number information of the carried data packet length. Meanwhile, in the control frame is further defined the information of a group of data packet lengths, and each data packet length indicates the service data length of one data frame in synchronization sequence or the payload length carried in a data frame.

The synchronization protocol control frame format in the embodiment of the present invention can be the form shown in FIG. 7. FIG. 7 illustrates how to carry payload length in the control frame. In practice, this data frame can include other contents or adopt other formats which are not limited in the embodiment of the present invention.

In the present example, the data packet length carried in the control frame is the data packet length of the data frame selected from the synchronization sequences through the following method: not carrying the data packet length of the first data frame in every 3 data frames, that is to say, carrying the data packet length of the 2nd data frame and 3rd data frame in every 3 data frames.

Figure 10:
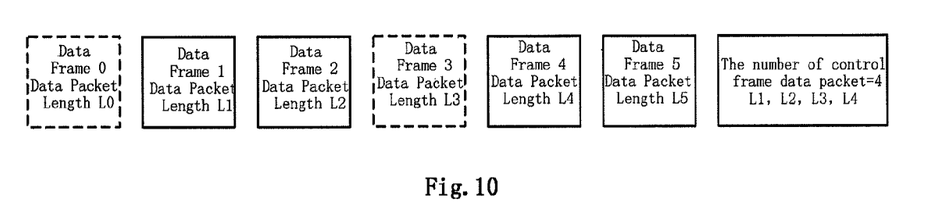
FIG. 10 is a schematic diagram of the synchronization sequence and its control frame according to Example 2 of the present invention.

FIG. 10 is a schematic diagram of a synchronization sequence and its control frame according to Example 2 of the present invention. As shown in FIG. 10, BMSC sends a synchronization protocol control frame following each synchronization sequence, that is to say, after it sends a synchronization sequence. Specifically, as shown in FIG. 7, the number of data frames in one synchronization sequence is 6, and their data packet lengths are L0 to L5 respectively and their data packet sequence numbers are 0 to 5 respectively. In a control frame corresponding to this synchronization sequence, BMSC carries the data packet lengths of Data Frame 1, 2, 4, and 5, namely, L1, L2, L4 and L5. Alternatively, the number of carried data packet lengths can also be additionally carried, that is 4. Preferably, BMSC can send the copy of the above-mentioned control frame for once or multiple times.

Data packet(s) may be lost in the following situations:

1. If Data Frame 0 is lost, the lower layer network element can obtain the data packet length of Data Frame 0 through the accumulated data packet length carried in Data Frame 1. To be specific, the data packet length of Data Frame 0 is the above-mentioned accumulated data length minus the data packet length of Data Frame 1.

2. If Data Frame 0 and Data Frame 1 are lost, the lower layer network element can obtain the data packet length of Data Frame 1 through the control frame and obtain the sum of the data packet lengths of Data Frame 0 and Data Frame 1 through the accumulated data packet length carried in Data Frame 2. Specifically, the data packet length of Data Frame 0 is the accumulated data length carried in Data Frame 2 minus the data packet length of Data Frame 1.

3. If Data Frames 0, 1 and 2 are lost, the lower layer network element can obtain the data packet length of Data Frames 1, 2 and 3, and the data packet length of Data Frame 0 is obtained through using the accumulated data length carried in Data Frame 3 and the data packet length of Data Frames 1, 2 and 3. To be specific, the data packet length of the Data Frame 0 is the accumulated data packet length carried in Data Frame 3 minus the data packet lengths of Data Frames 1, 2, and 3.

4. If Data Frames 0, 1, 2 and 3 are all lost, since the data packet lengths of two data frames (Data Frame 0 and 3) remain unknown, the length of each lost data frame cannot be calculated according to the accumulated data packet lengths carried subsequent data packets. That is to say, this solution is applicable to a condition where small probability occurs that 4 data frames are lost successively (lower than a certain threshold value).

In other words, this example can achieve the synchronization recovery in the following situation: when the data frames that are successively lost only include one data frame whose data packet length is not carried in the control frame, the lower layer network element can calculate the data packet length of the lost data frames according to the synchronization information such as the data packet length carried in the control frame and the accumulated data length carried in the received data frames.

More specifically, if the control frame carries the data packet length of N−1 data frames in every N data frames, the above-mentioned synchronization recovery cannot be achieved by this method in a condition that successive N+1 data frames are lost. In this example, N is 3, therefore the length of the lost service data packets cannot be recovered if 4 data packets are successively lost.

Device Embodiments

Figure 11:
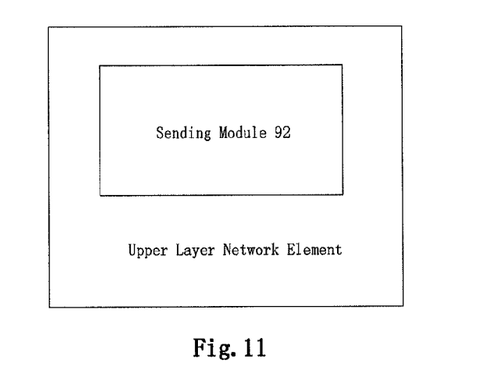
FIG. 11 is a structure block diagram of the upper network element according to the embodiment of the present invention.

According to the embodiment of the present invention, an upper layer network element is provided for achieving the synchronization processing method for multimedia broadcast multicast service as described in the above-mentioned method embodiments. FIG. 11 is a structure diagram of an upper layer network element according to the embodiment of the present invention. As shown in FIG. 11, this upper layer network element comprises: a Sending Module 92, used for sending a synchronization protocol control frame to a lower layer network element, wherein the synchronization protocol control frame carries the data packet length information of pre-determined data frames in the synchronization sequence corresponding to the synchronization protocol control frame. The pre-determined data frame comprises either of the following: each data frame, or partial data frames.

Figure 12:
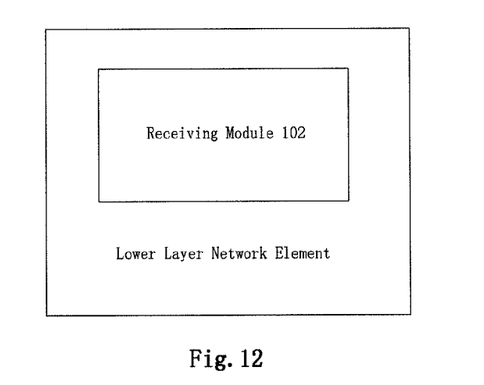
FIG. 12 is a structure block diagram of the lower layer network element according to the embodiment of the present invention.

According to the embodiment of the present invention, a lower layer network element is also provided for achieving the synchronization processing method for multimedia broadcast multicast service as described in the above-mentioned method embodiments. FIG. 12 is a structure diagram of a lower layer network element according to the embodiment of the present invention. As shown in FIG. 12, this lower layer network element comprises: a Receiver Module 102, used for receiving a synchronization protocol control frame sent from an upper layer network element, wherein the synchronization protocol control frame carries the data packet length information of pre-determined data frames in the synchronization sequence corresponding to the synchronization protocol control frame. The pre-determined data frame comprises either of the following: each data frame, or partial data frames.

Preferably, this lower layer network element can also comprise: a Synchronization Recovery Processing Module, connected to a Receiver Module 102, used for performing the synchronization recovery processing according to the data packet length information of the pre-determined data frames in the synchronization protocol control frame in a condition that the lower layer network element detects that data frame(s) in the synchronization sequence are lost.

It should be noted that, the lower layer network element and upper layer network element described in the device embodiments correspond to the above-mentioned method embodiments, and their specific implementation methods have been illustrated in detail in the method embodiments. Therefore it is not repeated here.

In conclusion, the synchronization processing solution for multimedia broadcast multicast service provided in the embodiments of the present invention can avoid that the lower layer network element loses synchronization for a long time in the condition that service data packets are lost, thus improving the Robustness and efficiency for the MBMS service synchronization.

It should be noted that, the steps shown in the flowchart of the drawings can be executed in a computer system, such as a group of commands that computers can execute. Although the logic sequence is shown in the flowchart, the steps shown or described can be executed in a sequence different from the sequence shown herein under some circumstances.

Apparently, those skilled in the art should understand, each foregoing module or each step of the present invention can be realized with general computing devices; they can be centralized on a single computing device or distributed in the network consisting of several computing devices; alternatively, they can be realized through program codes that can be executed by computing devices so that they can be stored in storage devices and executed by computing devices, or they can be manufactured as each integrated circuit module respectively, or several modules or steps of them can be manufactured as a single integrated circuit. In this way, the present invention is not limited to any specific combination of hardware and software.

The foregoing description is only for preferred embodiments of the present invention, and shall not limit the present invention. Those skilled in the art should understand that the present invention can have various modifications and alternations. Any modifications, equivalent replacements or improvements without departing the spirits and principles of the present invention shall belong to the protection scope of the present invention.

What is claimed:

1. A synchronization processing method for multimedia broadcast multicast service, comprising:
    an upper layer network element sending a synchronization sequence including a plurality of synchronization protocol data frames to a plurality of lower layer network elements, wherein the upper layer network element is a Broadcast Multicast Service Center (BMSC), and each of the lower layer network elements is a base station or a radio network controller;
    the upper layer network element sending a synchronization protocol control frame to each of the lower layer network elements, wherein said synchronization protocol control frame carries the number of the synchronization protocol data frames included in the synchronization sequence and data packet length information of each of the synchronization protocol data frames; and
    when at least two consecutive frames of the plurality of synchronization protocol data frames are lost, obtaining by the lower layer network element the length of each of the at least two consecutively synchronization protocol data frames that are lost to keep synchronization with other lower layer network elements receiving data packets successfully.

2. The method according to claim 1, wherein, said data packet length information of said synchronization protocol data frame comprises either of the following: length information of said synchronization protocol data frames, or length information of service data carried in said synchronization protocol data frames.

3. The method according to claim 2, wherein, the frame format of said synchronization protocol control frame comprises at least one of the following: extension to type 0 frame format defined in the synchronization protocol, and a pre-determined frame format.

4. The method according to claim 1, wherein, the frame format of said synchronization protocol control frame comprises at least one of the following: extension to type 0 frame format defined in the synchronization protocol, and a pre-determined frame format.

5. A synchronization processing method for multimedia broadcast multicast service, comprising:
   each of a plurality of lower layer network elements receiving a synchronization sequence including a plurality of synchronization protocol data frames from an upper layer network element, wherein the upper layer network element is a Broadcast Multicast Service Center (BMSC), and each of the lower layer network elements is a base station or a radio network controller;
   each of the lower layer network elements receiving a synchronization protocol control frame from the upper layer network element, wherein said synchronization protocol control frame carries the number of the synchronization protocol data frames included in the synchronization sequence and data packet length information of each of the synchronization protocol data frames; and
   when at least two consecutive frames of the plurality of synchronization protocol data frames are lost, obtaining by the lower layer network element the length of each of the at least two consecutively synchronization protocol data frames that are lost to keep synchronization with other lower layer network elements receiving data packets successfully.

6. The method according to claim 5, wherein, after said lower layer network element receives said synchronization protocol control frame from said upper layer network element, said method further comprises:
   said lower layer network element performing the synchronization recovery processing according to said data packet length information of said synchronization protocol data frames in said synchronization protocol control frame in a condition that said lower layer network element detects that at least one data frame in said synchronization sequence are lost.

7. A Broadcast Multicast Service Center (BMSC), comprising:
   a Sending Module, used for sending a synchronization sequence including a plurality of synchronization protocol data frames to each of a plurality of lower layer network elements, and for sending a synchronization protocol control frame to each of the lower layer network elements, wherein said synchronization protocol control frame carries the number of the synchronization protocol data frames included in the synchronization sequence and data packet length information of each of the synchronization protocol data frames, and the lower layer network element is a base station or a radio network controller;
   whereby, when at least two consecutive frames of the plurality of synchronization protocol data frames are lost, the lower layer network element obtains the length of each of the at least two consecutively synchronization protocol data frames that are lost to keep synchronization with other lower layer network elements receiving data packets successfully.

8. A plurality of lower layer network elements, wherein each of the lower layer network elements is a base station or a radio network controller, comprising:
   a Receiver Module, used for receiving a synchronization sequence including a plurality of synchronization protocol data frames from an upper layer network element, and used for receiving a synchronization protocol control frame from the upper layer network element, wherein said synchronization protocol control frame carries the number of the synchronization protocol data frames including in the synchronization sequence and data packet length information of each of the synchronization protocol data frames;
   whereby, when at least two consecutive frames of the plurality of synchronization protocol data frames are lost, the lower layer network element obtains the length of each of the at least two consecutively synchronization protocol data frames that are lost to keep synchronization with other lower layer network elements receiving data packets successfully.

9. The lower layer network element according to claim 8, wherein, said lower layer network element further comprises:
   a Synchronization Recovery Processing Module, used for performing the synchronization recovery processing according to said data packet length information of said synchronization protocol data frames in said synchronization protocol control frame in a condition that the lower layer network element detects that at least one data frames in said synchronization sequence are lost; and
   a hardware processor, used for executing the Synchronization Recovery Processing Module.

* * * * *